United States Patent [19]

Ballard

[11] 4,291,530
[45] Sep. 29, 1981

[54] GAS TURBINE ENGINE COWLING

[75] Inventor: John R. Ballard, Chesham, England

[73] Assignee: Rolls-Royce Limited, London, England

[21] Appl. No.: 116,653

[22] Filed: Jan. 29, 1980

[30] Foreign Application Priority Data

Mar. 16, 1979 [GB] United Kingdom ............... 09332/79

[51] Int. Cl.³ .............................................. F02C 7/052
[52] U.S. Cl. ................ 60/39.09 P; 60/39.5; 55/306
[58] Field of Search .......................... 60/39.09 P, 39.5; 415/121 G; 55/306

[56] References Cited

U.S. PATENT DOCUMENTS

| | | | |
|---|---|---|---|
| 3,421,296 | 1/1969 | Beurer | 60/39.09 P |
| 3,998,048 | 12/1976 | L'rue | 60/39.09 P |
| 4,018,046 | 4/1977 | Hurley | 60/39.5 |

*Primary Examiner*—Louis J. Casaregola

*Attorney, Agent, or Firm*—Cushman, Darby & Cushman

[57] ABSTRACT

A gas turbine engine cowling suitable for a helicopter contains a gas turbine engine having a vortex tube separator panel for the purpose of separating water droplets and particulate material from engine inlet air. The vortex tube separator panel is mounted in a duct extending the length of the cowling so that air passing through the duct supplies air for passing through the panel to the engine inlet as well as maintaining a flow of air transverse to the panel. The air flow transverse to the panel ensures that blockage of the panel by ice is substantially reduced or eliminated. Under forward flight conditions, ram air passes through the duct but during hovering, the air flow through the duct is induced by an ejector powered by the exhaust efflux from the engine. The portion of the air flow through the duct which does not enter the gas turbine engine is utilized in the cooling of the engine exhaust efflux in order to reduce the amount of infra-red radiation emitted thereby.

8 Claims, 2 Drawing Figures

GAS TURBINE ENGINE COWLING

This invention relates to a gas turbine engine cowling and in particular to a gas turbine engine cowling suitable for a helicopter.

The engines of gas turbine engine powered helicopters are conventionally mounted in cowlings positioned on the roof of the helicopter. This ensures that when such helicopters are required to operate over water or dusty ground the ingestion of water spray and particulate matter by the engine is minimised. Despite this precaution, however, water spray and particulate matter ingestion is still a problem and consequently it is common practice to provide the engine cowling with a device for separating the spray and particulate matter from the engine intake air. One form of separator commonly employed is known as a vortex tube separator panel. It consists of a bank of tubes mounted side-by-side in a suitable casing, each tube containing a bladed structure adapted to induce air passing through the tube into a vortex. This ensures that any liquid spray or particulate material carried by the air is centrifuged to the radially outer reaches of each tube. A frusto conical shaped collector at the end of each tube separates the centrifuged spray and particulate material from the air flow whilst permitting the clean air to pass to the engine inlet. Such vortex tube separator panels are themselves well known.

It is usual to mount vortex tube separator panels on the outer surfaces of engine cowlings in such a manner that air passing along the side of the cowling as the helicopter is in flight is drawn through the separator panel and into the engine intake. It has been found with such surface mounted separator panels however that whilst they are very effective when the helicopter is flying at forward speeds of more than 40 or 50 knots, their efficiency falls off rapidly below these speeds if icing conditions are encountered. Thus if the helicopter is hovering or moving with a slow forward speed under icing conditions, the vortex separator tubes quickly become blocked with ice. This in turn results in air starvation of the engine, thereby drastically reducing its power or even stopping it.

It is an object of the present invention to provide a gas turbine engine cowling suitable for a helicopter which cowling is provided with a vortex tube separator panel, in which such blockage is substantially reduced or eliminated under hovering or low forward speed conditions.

According to the present invention, a gas turbine engine cowling suitable for a helicopter comprises a casing enclosing a gas turbine propulsion engine, primary duct means adapted for the passage of air through said cowling, secondary duct means interconnecting said primary duct means and the air intake of said engine, a vortex tube separator panel interposed between said primary duct means and the intake of said engine and located at the junction of said primary and secondary duct means so as to constitute a portion of the wall of said primary duct means, and air flow inducing means powered in operation by said engine and adapted to induce an airflow through said primary duct means.

Thus since an air flow is maintained over the surface of the vortex tube separator panel by virtue of the induced air flow through the primary duct means, a simulation of forward speed is achieved, thereby ensuring that icing of the vortex tube separators is reduced or eliminated.

Said vortex tube separator panel is preferably adapted such that in operation, any water droplets or particulate material separated thereby are exhausted therefrom by the flow of air passing in operation through said primary duct means.

Said air flow inducing means preferably comprises an ejector powered in operation by the exhaust efflux of said engine.

Said primary duct means preferably terminates in a nozzle adapted to define said ejector with the exhaust efflux nozzle of said gas turbine engine.

Thus the flow of air passing in operation through said primary duct means serves to cool the exhaust efflux of said gas turbine engine. Consequently the infra-red radiation emitted by the exhaust efflux is considerably reduced.

The primary duct means is preferably provided with an air inlet so positioned as to provide in operation a ram air flow through said primary duct means when said cowling is located on a helicopter in foward flight.

Thus when the cowling in accordance with the present invention is mounted on a helicopter in forward flight, there is an increased air flow through the primary duct means, thereby satisfying the inlet air demand of the gas turbine propulsion engine as well as providing increased cooling of the engine exhaust efflux.

Said primary duct means may be provided with at least one subsidiary air inlet adapted to increase the air flow through at least a portion of said primary duct means.

Said primary duct means nozzle is preferably so shaped that any infra-red radiation emitted in operation by said gas turbine engine is screened so as not to be visible externally of said cowling.

The wall of said primary duct means nozzle may be of a double skinned construction so as to define cooling air passages within the wall, said cooling air passages being adapted in operation to be supplied with ram air when said cowling is located on a helicopter in forward flight.

The invention will now be described, by way of example, with reference to the accompanying drawings in which.

Figure 1:
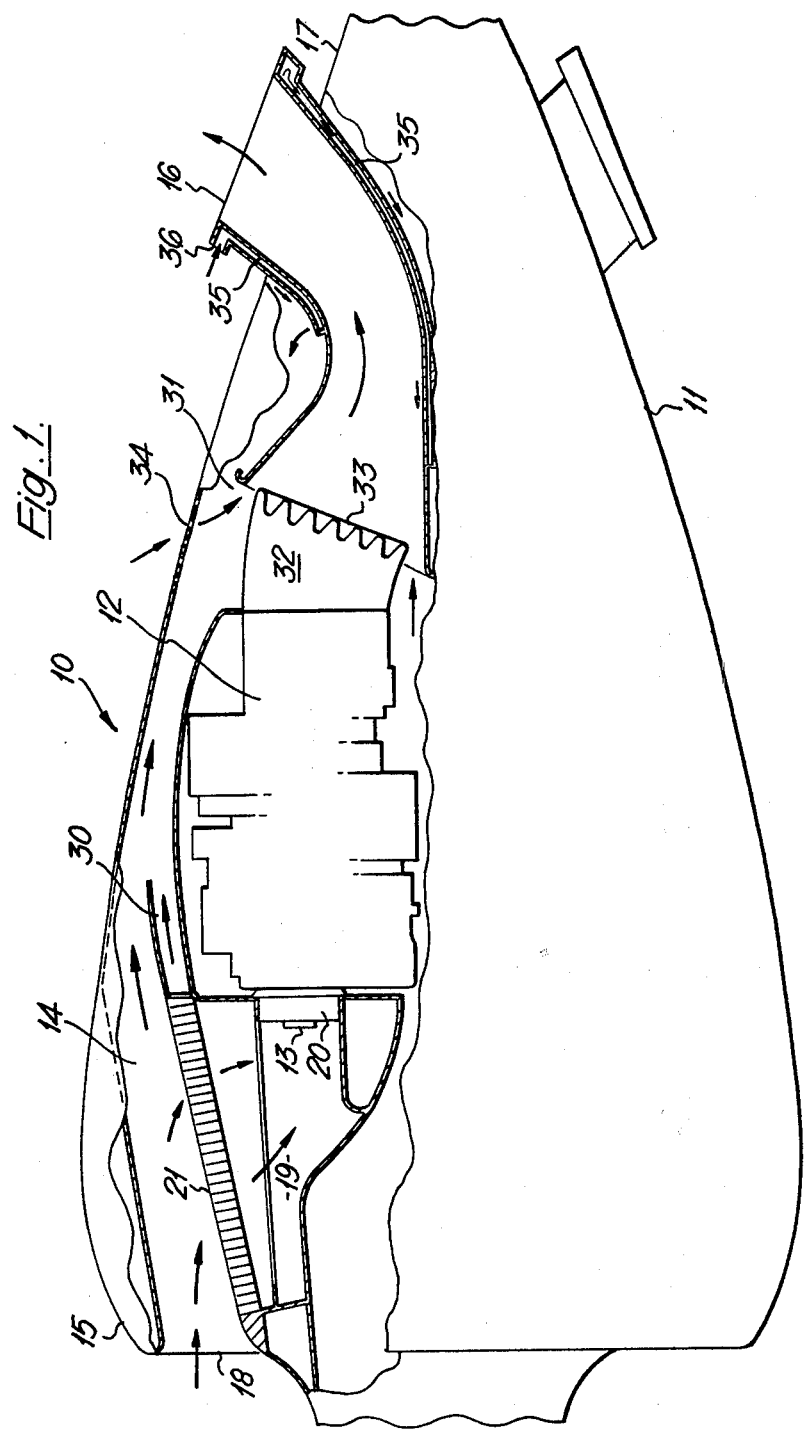
FIG. 1 is a partially sectioned plan view of a gas turbine engine cowling in accordance with the present invention.

With reference to FIG. 1 a gas turbine engine cowling generally indicated at 10 comprises a casing 11 which encloses two similar gas turbine engines, only one of which 12 can be seen in the drawing, in side by side relationship. The cowling 10 is adapted to be mounted on the roof of a helicopter (not shown) in such a manner that the gas turbine engines may be used to power the helicopter. Each gas turbine engine is provided with a power shaft (not shown) which conveys rotatary motion from the power offtake point 13 of the engine to an appropriate gearbox on the helicopter.

A primary duct 14 extends from the foward end 15 of the cowling 10 to a nozzle 16 provided at and protruding from the rearward end 17 of the cowling 10. The forward end of the primary duct 14 is provided with an air inlet 18 which provides for a ram air flow through the primary duct 14 when the helicopter on which the cowling 10 is mounted is in forward flight. A secondary duct 19 interconnects the primary duct 14 with the air intake 20 of the gas turbine engine 12 so that the total air supply for the gas turbine engine 12 is derived from the primary duct 14.

In order to separate any water spray or particulate material from the air supplied to the gas turbine engine 12, a vortex tube separator panel 21 is located at the junction of the primary and secondary ducts 14 and 19 so as to constitute a portion of the wall of the primary duct 14. The vortex tube separator panel 21 thus extends completely across the secondary duct 19 so that all air supplied to the engine air intake 20 must flow through it.

Figure 2:
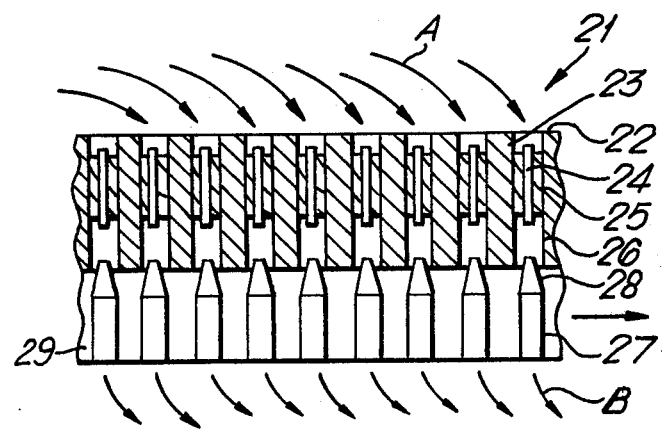
FIG. 2 is an enlarged sectioned side view of a portion of the vortex tube separator panel included in the cowlings shown in FIG. 1.

The vortex tube separator panel 21 is of known conventional construction as can be seen in FIG. 2. Essentially the panel 21 consists of a casing 22 containing a large number of tubes 23 mounted side by side. Each tube 23 contains a central core 24 on which a number of blades 25 are mounted; the blades extending between the central core 24 and the internal wall 26 of the tube 23. The blades 25 are so shaped as to induce any air passing through the tube 23 (indicated by the arrows A) into a vortex. This ensures that any water droplets or particulate material carried by the air A is centrifuged to the radially outer reaches of the tube 26. At the downstream end of each tube 26 there is provided a further tube 27 having a frusto conical end portion 28. This frusto conical end portion 28 diverts the water droplets and particulate material into a chamber 29 within the casing 22 whilst the remaining clean air B passes through the further tubes 27 and into the air intake 20 of the gas turbine engine 12.

Referring back to FIG. 1, the downstream end 30 of the vortex tube separator panel 21 (with respect to the airflow through the primary duct 14) is open to the airflow passing in operation through the primary duct 14. Consequently water droplets and particulate material captured within the separator panel chamber 29 are exhausted therefrom by the flow of air through the primary duct 14. It will be appreciated however that other suitable means such as a mechanical pump could be employed in removing the water droplets and particulate material from the chamber 29.

The nozzle 16 of the primary duct 14 is so shaped as to define an ejector 31 with the exhaust efflux nozzle 32 of the gas turbine 12. Consequently even when the helicopter on which the cowling 10 is in operation mounted is not travelling fowards, the operation of the ejector 31 ensures that an airflow is induced in the primary duct 14. This in turn ensures that an airflow passes over the vortex tube separator panel 21 which is sufficient to ensure that it does not become partially or completely blocked by ice.

The exhaust efflux nozzle 32 of the gas turbine engine 12 is provided around its downstream end with an array of scallops 33. These promote effective mixing of the relatively hot efflux issued in operation from the gas turbine engine 12 and the relatively cool air passing through the primary duct 14. Consequently the gases eventually issued from the nozzle 16 are cooled, thereby reducing the amount of infra-red radiation which they emit.

Further cooling of the gases issued from the nozzle 16 is achieved by the provision of a subsidiary air inlet 34 in the side of the primary duct which increases the amount of cool air passing through the nozzle 16. Moreover the wall of the nozzle 16 is of a double skinned construction so as to define cooling air passages 35 within the wall. A ram air inlet 36 is positioned on the portion of the nozzle 16 protruding beyond the cowling 10 to provide the cooling air passages with relatively cold ambient air. Thus it will be seen that the gases eventually emerging from the nozzle 16 will be considerably cooler than those issued from the gas turbine engine 12, thereby resulting in a considerable decrease in the amount of infra-red radiation emitted by thoses gases.

In order to ensure that any infra-red radiation emitted by the hot components of the gas turbine engine 12 is screened from visibility externally of the cowling 10, the nozzle 16 is appropriately curved. It will be appreciated however that other forms of construction could be utilised in screening infra-red radiation from the gas turbine engine 12. For example, instead of being curved, the nozzle 16 could be provided with an infra-red radiation screening centre body.

The reduction of the amount of infra-red radiation emitted from the area of the nozzle 16 is important in protecting any helicopter on which the cowling is mounted from infra-red seeking missiles.

Although the present invention has been described with reference to a cowling 10 containing two gas turbine propulsion engines, it will be appreciated that it is equally applicable to cowlings containing one or more than two engines.

I claim:

1. A gas turbine engine cowling suitable for a helicopter comprising a casing, a gas turbine engine enclosed within said casing, primary duct means adapted for the passage of air through said cowling, secondary duct means interconnecting said primary duct means and the air intake of said engine, a vortex tube separator panel interposed between said primary duct means and the intake of said engine and located at the junction of said primary and secondary duct means so as to constitute a portion of the wall of said primary duct means, and air flow inducing means powered in operation by said engine and adapted to induce an airflow through said primary duct means.

2. A gas turbine engine cowling as claimed in claim 1 wherein said vortex tube separator panel is adapted such that in operation, any water droplets or particulate materials separated thereby are exhausted therefrom by the flow of air passing in operation through said primary duct means.

3. A gas turbine engine cowling as claimed in claim 1 wherein said airflow inducing means comprises an ejector powered in operation by the exhaust efflux of said engine.

4. A gas turbine engine cowling as claimed in claim 3 wherein said primary duct means terminates in a nozzle adapted to define said ejector with the exhaust efflux of said gas turbine engine.

5. A gas turbine engine cowling as claimed in claim 1 wherein said primary duct means is provided with an air inlet so positioned as to provide in operation a ram air flow through said primary duct means when said cowling is located in a helicopter in forward flight.

6. A gas turbine engine cowling as claimed in claim 1 wherein said primary duct means is provided with at least one subsidiary air inlet adapted to increase the air flow through at least a portion of said primary duct means.

7. A gas turbine engine cowling as claimed in claim 4 wherein said primary duct means nozzle is so shaped that any infra-red radiation emitted in operation by said gas turbine engine is screened so as not to be visible externally of said cowling.

8. A gas turbine engine cowling as claimed in claim 4 wherein the wall of said primary duct means nozzle is of a double skinned construction so as to define cooling air passages within the wall, said cooling air passages being adapted in operation to be supplied with ram air when said cowling is located on a helicopter in forward flight.

* * * * *